United States Patent
Gesch et al.

(10) Patent No.: US 11,276,304 B2
(45) Date of Patent: Mar. 15, 2022

(54) SYSTEMS AND METHODS FOR ADDRESSING A MOVING VEHICLE RESPONSE TO A STATIONARY VEHICLE

(71) Applicants: Denso International America, Inc., Southfield, MI (US); Denso Corporation, Kariya (JP)

(72) Inventors: Matthew Gesch, Northville, MI (US); Jin Kurumisawa, Aichi (JP); Andrew Mueller, Farmington Hills, MI (US)

(73) Assignees: Denso International America, Inc., Southfield, MI (US); Denso Corporation, Kariya (JP)

( * ) Notice: Subject to any disclaimer, the term of this patent is extended or adjusted under 35 U.S.C. 154(b) by 302 days.

(21) Appl. No.: 16/226,933

(22) Filed: Dec. 20, 2018

(65) Prior Publication Data

US 2020/0202713 A1 Jun. 25, 2020

(51) Int. Cl.
| | |
|---|---|
| *G08G 1/0967* | (2006.01) |
| *G05D 1/02* | (2020.01) |
| *B60Q 9/00* | (2006.01) |
| *G08G 1/16* | (2006.01) |

(52) U.S. Cl.
CPC ......... *G08G 1/096725* (2013.01); *B60Q 9/00* (2013.01); *G05D 1/0223* (2013.01); *G05D 1/0231* (2013.01); *G05D 1/0257* (2013.01); *G05D 1/0276* (2013.01); *G08G 1/165* (2013.01); *G05D 2201/0213* (2013.01)

(58) Field of Classification Search
CPC ............. G08G 1/096725; G08G 1/165; G08G 1/096791; G08G 1/0965; G05D 1/0223; G05D 1/0257; G05D 1/0231; G05D 1/0276; G05D 2201/0213; B60Q 9/00
See application file for complete search history.

(56) References Cited

U.S. PATENT DOCUMENTS

| | | | |
|---|---|---|---|
| 8,473,144 B1 * | 6/2013 | Dolgov | B60W 30/18163 701/28 |
| 8,977,007 B1 | 3/2015 | Ferguson et al. | |
| 9,278,689 B1 | 3/2016 | Delp | |
| 9,821,801 B2 * | 11/2017 | Di Cairano | B60W 30/10 |
| 10,906,542 B2 * | 2/2021 | Gesch | G06K 9/00805 |
| 10,916,134 B2 * | 2/2021 | Gesch | B60W 50/14 |

(Continued)

*Primary Examiner* — Nga X Nguyen
(74) *Attorney, Agent, or Firm* — Christopher G. Darrow; Darrow Mustafa PC (57) ABSTRACT

System, methods, and other embodiments described herein relate to dynamically determining an appropriate responsive action for a moving vehicle in accordance with local traffic regulations. In one embodiment, the disclosed system identifies a stationary vehicle in an environment of the subject vehicle based at least in part on information from a plurality of sensors disposed on the subject vehicle and classifies a type of the stationary vehicle as valid or abandoned based at least in part on the information from the plurality of sensors. A classification of valid indicates that a traffic regulation requires the subject vehicle to undertake a responsive action toward the stationary vehicle. The disclosed system obtains a local traffic regulation based on a location of the subject vehicle and modifies a trajectory of the subject vehicle based on the local traffic regulation when the type of the stationary vehicle is determined to be valid.

20 Claims, 7 Drawing Sheets

(56) References Cited

U.S. PATENT DOCUMENTS

2015/0166062 A1 6/2015 Johnson et al.
2018/0137756 A1 5/2018 Moosaei et al.
2019/0278280 A1* 9/2019 Imai .................... B60W 30/09

* cited by examiner

SYSTEMS AND METHODS FOR ADDRESSING A MOVING VEHICLE RESPONSE TO A STATIONARY VEHICLE

TECHNICAL FIELD

The subject matter described herein relates to systems and methods for controlling a moving vehicle in response to a stationary vehicle, and, more particularly, to dynamically determining an appropriate responsive action for a moving vehicle in accordance with local traffic regulations.

BACKGROUND

So-called "move over" laws are laws that require drivers to move over and change lanes to give safe clearance to stationary ambulances and stationary vehicles of law enforcement officers, firefighters, utility workers, municipal workers, road maintenance workers and in some cases, tow-truck drivers. Such vehicles that are the protected subjects of move over laws will be referred to herein as "valid" vehicles under a given move over law.

In the U.S., some jurisdictions enforce move over laws that designate specific speeds to slow down to when a driver passes by a stationary valid vehicle in an adjacent lane. For example, as of the time of this filing Indiana state law requires drivers approaching a stationary emergency vehicle displaying flashing lights, including towing and recovery vehicles, traveling in the same direction, to vacate the lane closest, if safe and possible to do so, or reduce speed at least 10 mph below the speed limit. In contrast, other U.S. jurisdictions enforce move over laws that do not designate a specific speed reduction amount but instead require drivers to slow down. For example, as of the time of this filing Illinois state law requires drivers approaching stationary emergency vehicles displaying flashing lights, including towing and recovery vehicles, traveling in the same direction, to vacate the lane closest if safe and possible to do so, or slow to a safe speed.

SUMMARY

In one embodiment, example systems and methods associated with dynamically determining an appropriate responsive action for a moving vehicle in accordance with local traffic regulations are disclosed. As previously noted, different jurisdictions can enforce move over laws having different requirements. There is currently no solution to autonomous vehicles dynamically recognizing a valid vehicle and taking an appropriate response in accordance with local traffic regulations. Nor is there any solution for informing a driver of a vehicle of the requirements of local traffic regulations when the driver approaches a valid vehicle.

Therefore, a vehicle control system for a subject vehicle is disclosed. For example, in one approach, the disclosed system identifies a stationary vehicle in an environment of the subject vehicle based at least in part on information from a plurality of sensors disposed on the subject vehicle and classifies a type of the stationary vehicle as valid or abandoned based at least in part on a presence of a pedestrian near the stationary vehicle. A valid vehicle is one that a traffic regulation indicates the subject vehicle is to undertake a responsive action toward. The disclosed system obtains a local traffic regulation based on a location of the subject vehicle and modifies a trajectory of the subject vehicle based on the local traffic regulation when the type of the stationary vehicle is determined to be valid.

In one embodiment, a non-transitory computer-readable medium is disclosed. The computer-readable medium stores instructions that when executed by one or more processors cause the one or more processors to perform the disclosed functions. The instructions include instructions to identify a stationary vehicle in an environment of a subject vehicle based at least in part on information from a plurality of sensors disposed on the subject vehicle, classify a type of the stationary vehicle as valid or abandoned based at least in part on a presence of a pedestrian near the stationary vehicle, obtain a local traffic regulation based on a location of the subject vehicle, and modify a trajectory of the subject vehicle based on the local traffic regulation when the type of the stationary vehicle is determined to be valid.

In another embodiment, a method for operating a subject vehicle is disclosed. The method includes identifying a stationary vehicle in an environment of the subject vehicle based at least in part on the information from a plurality of sensors on the subject vehicle and classifying a type of the stationary vehicle as valid or abandoned based at least on a presence of a pedestrian near the subject vehicle. A valid vehicle is one that a traffic regulation requires a responsive action toward. The method further includes obtaining a local traffic regulation based on a location of the subject vehicle generating a control signal that indicates the type and that causes the subject vehicle to perform one or more actions.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods and embodiments associated with controlling a moving vehicle in response to a stationary vehicle and to dynamically determining an appropriate responsive action in accordance with local traffic regulations are disclosed. As previously noted, different jurisdictions can enforce different traffic laws that establish required responsive actions of drivers passing a stationary valid vehicle. However, if a driver is approaching a stationary vehicle there is currently no efficient way to dynamically determine whether the vehicle is a valid vehicle under the local move over laws or determine the speed and lane requirements of the local move over law, particularly while driving.

In addition, autonomous vehicles are becoming more prevalent. At the time of manufacture, the venues of sale and operation of the autonomous vehicle may be unknown. However, the autonomous vehicle will need to comply with the local traffic regulations, including move over laws, wherever they are sold and used.

Therefore, in various embodiments, a vehicle control system and associated methods are disclosed herein that automatically identify stationary vehicles, determine whether the stationary vehicles are valid vehicles for enforcing the move over law, determine the requirements of the local move over law, and either provide a notification of the requirements to the driver or, in autonomous vehicles, automatically execute an appropriate maneuver considering the contextual circumstances.

The driving control system, in one embodiment, detects a stopped vehicle and automatically classifies the stopped vehicle as being either an abandoned vehicle or valid vehicle. As previously mentioned, a valid vehicle is a type of vehicle that a move over law requires drivers to take a response action toward by slowing down and/or changing lanes. A valid vehicle can be, for example, a police car, an ambulance, a road maintenance vehicle, a tow truck, etc.

The vehicle control system can operate as part of an autonomous vehicle control system or a vehicle being driven by a human driver. In an autonomous vehicle, when the vehicle control system detects a stationary vehicle it can classify the vehicle as abandoned or valid. When the system classifies the stopped vehicle as a valid vehicle, the vehicle control system can: 1) determine the requirements of the local move over law, 2) determine an appropriate modification to the current trajectory and speed of the autonomous vehicle under the current circumstances in accordance with the local move over law, 3) provide a notification to a user of the autonomous vehicle indicating that the autonomous vehicle is approaching a valid vehicle and about to modify the trajectory and speed of the autonomous vehicle, and 4) execute the modification.

In a human-driven vehicle, when the vehicle control system classifies a stopped vehicle as a valid vehicle, the vehicle control system can provide the driver of the subject vehicle a notification indicating: 1) the driver is approaching a valid vehicle, and 2) the requirements of the local move over law. In this way the system improves operation of the vehicle through notifications provided to the driver thereby ensuring better conformance with local traffic laws.

Figure 1:
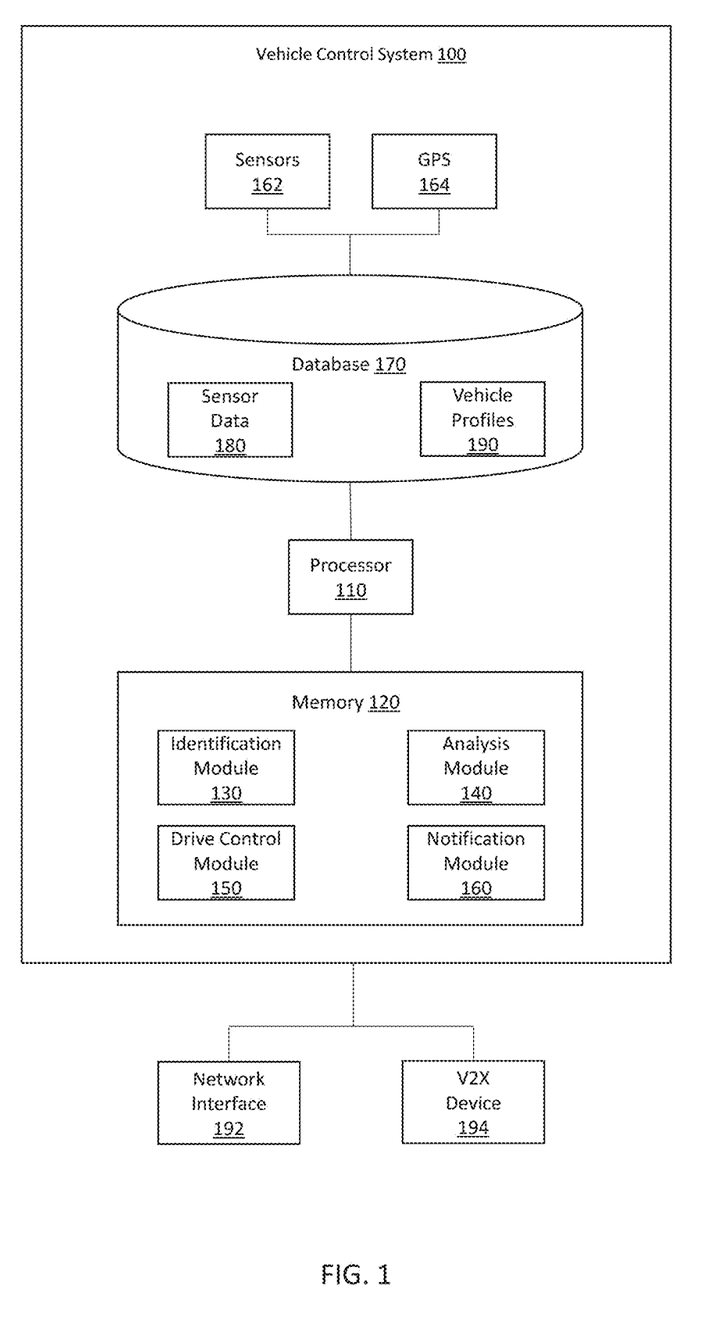
FIG. 1 illustrates one embodiment of a vehicle control system according to the disclosed subject matter.

Referring to FIG. 1, one embodiment of a vehicle control system 100 is illustrated. While arrangements will be described herein with respect to the vehicle control system 100, it will be understood that embodiments are not limited to a unitary system as illustrated. In some implementations, the vehicle control system 100 may be embodied as a cloud-computing system, a cluster-computing system, a distributed computing system, a software-as-a-service (SaaS) system, and so on. Accordingly, the vehicle control system 100 is illustrated and discussed as a single device for purposes of discussion but should not be interpreted to limit the overall possible configurations in which the disclosed components may be configured. For example, the separate modules, memories, databases, and so on may be distributed among various computing systems in varying combinations.

The vehicle control system 100 also includes various elements. It will be understood that in various embodiments it may not be necessary for the vehicle control system 100 to have all of the elements shown in FIG. 1. The vehicle control system 100 can have any combination of the various elements shown in FIG. 1. Further, the vehicle control system 100 can have additional elements to those shown in FIG. 1. In some arrangements, the vehicle control system 100 may be implemented without one or more of the elements shown in FIG. 1. Further, while various elements are shown as being located within the vehicle control system 100 in FIG. 1, it will be understood that one or more of these elements can be located external to the vehicle control system 100. Further, the elements shown may be physically separated by large distances.

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle control system 100 is implemented to perform methods and other functions as disclosed herein relating to dynamically determining an appropriate responsive action for a moving vehicle in accordance with local traffic regulations. The noted functions and methods will become more apparent with a further discussion of the figures. Furthermore, the vehicle control system 100 is shown as including a processor 110. Thus, in various implementations, the processor 110 may be a part of the vehicle control system 100, the vehicle control system 100 may access the processor 110 through a data bus or another communication pathway, the processor 110 may be a remote computing resource accessible by the vehicle control system 100, and so on. In either case, the processor 110 is an electronic device such as a microprocessor, an ASIC, or another computing component that is capable of executing machine-readable instructions to produce various electronic outputs therefrom that may be used to control or cause the control of other electronic devices.

In one embodiment, the vehicle control system 100 includes a memory 120 that stores one or more of an identification module 130, an analysis module 140, a drive control module 150 and a notification module 160. The memory 120 is a random-access memory (RAM), read-only memory (ROM), a hard-disk drive, a flash memory, or other suitable memory for storing the modules 130, 140, 150 and 160. The modules 130, 140, 150 and 160 are, for example, computer-readable instructions that when executed by the processor 110 cause the processor 110 to perform the various functions disclosed herein. In various embodiments, the modules 130, 140, 150 and 160 can be implemented in different forms that can include but are not limited to hardware logic, an ASIC, components of the processor 110, instructions embedded within an electronic memory, and so on.

Figure 2:
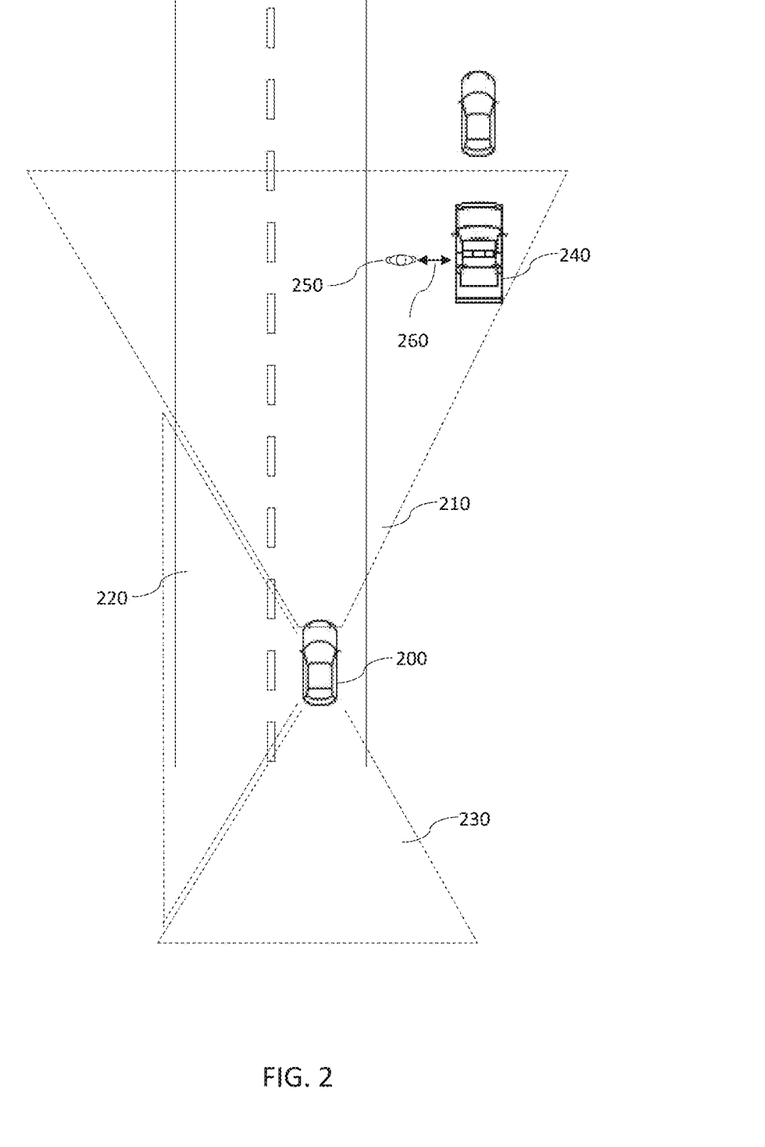
FIG. 2 illustrates an example driving scenario in which the disclosed vehicle control system can operate.

The vehicle control system 100 also includes one or more sensors 162 disposed on the subject vehicle and can include a global position system (GPS) 164. The sensors 162 can include, for example a radar, camera, LIDAR, and/or other types of sensors that can provide information about an environment around the subject vehicle. Referring to FIG. 2, the sensors 162 can be arranged to obtain data from specific directions, such as forward-facing radar, camera, and LIDAR sensors to obtain data indicating what lies in a region 210 ahead of the subject vehicle, side or corner facing sensors to obtain data indicating what lies a region 220 on either side of the subject vehicle (e.g., in an adjacent lane), and rear-facing sensors to obtain data indicating what lies in a region 230 behind the subject vehicle.

Referring back to FIG. 1, the vehicle control system 100 can communicate with external systems that are separate from the subject vehicle (e.g., a cloud server, another vehicle, a mobile communication device, etc.) via a network interface 192 and/or via a vehicle-to-everything (V2X) communication device 194.

With continued reference to the vehicle control system 100, in one embodiment, the system 100 includes a database 170. The database 170 is, in one embodiment, an electronic data structure stored in the memory 120, a distributed memory, a cloud-based memory, or another data store and that is configured with routines that can be executed by the processor 110 for analyzing stored data, providing stored data, organizing stored data, and so on. Thus, in one embodiment, the database 170 stores data used by the modules 130, 140, 150 and 160 in executing various determinations. In one embodiment, the database 170 stores sensor data 180 obtained by the sensors 162 and stores vehicle profiles 190. The sensor data 180 can include, for example, digital images, radar data, and/or LIDAR data. The sensor data 180 can be augmented with timestamps and location data from GPS 164. As will be discussed below, the vehicle profiles 190 can include a classification and a location of stationary vehicles detected in the sensor data 180.

In one embodiment, the identification module 130 includes one or more computer-readable instructions that, when executed by the processor 110, causes the processor 110 to identify a stationary vehicle in the environment based at least in part on the information from the sensors 162 and classify a type of the stationary vehicle as being a valid vehicle or abandoned vehicle based at least in part on a presence of a pedestrian near the stationary vehicle. A valid vehicle is one that a traffic regulation indicates the subject vehicle is to undertake a responsive action toward. For example, a stopped police car (i.e., stationary vehicle) with a police officer (i.e. pedestrian) standing nearby would be classified as a valid vehicle under the move over laws of many jurisdictions in the U.S.

The identification module 130 can identify a stationary vehicle in the sensor data 180, for example, by using one or more machine learning models such as a neural network trained to identify vehicles in sensor data or clustering methods to separately distinguish objects in digital images. Using such techniques, the identification module 130 can furthermore determine whether a pedestrian is near the stationary vehicle and also identify relevant contextual information, such as posted speed limits and emergency zone indicators.

When a pedestrian is present, the identification module 130 can include instructions to process at least some of the information from the sensors 162 to determine a lateral distance between the pedestrian and the stationary vehicle. The identification module 130 can further include instructions that classify the type of the stationary vehicle as valid or abandoned based at least in part on the lateral distance.

FIG. 2 shows an example driving scenario in which the disclosed vehicle control system 100 can operate. In FIG. 2, a subject vehicle 200 is approaching a stationary vehicle 240. A pedestrian 250 is standing within a vicinity of the stationary vehicle 240. Both the pedestrian 250 and the stationary vehicle are within the region 210 ahead of the subject vehicle 200 that is scanned or imaged by sensors 162 on the subject vehicle 200. The identification module 130 determines a lateral distance 260 between the pedestrian 250 and the stationary vehicle 240 based on the information from the sensors 162 scanning the region 210.

Figure 3:
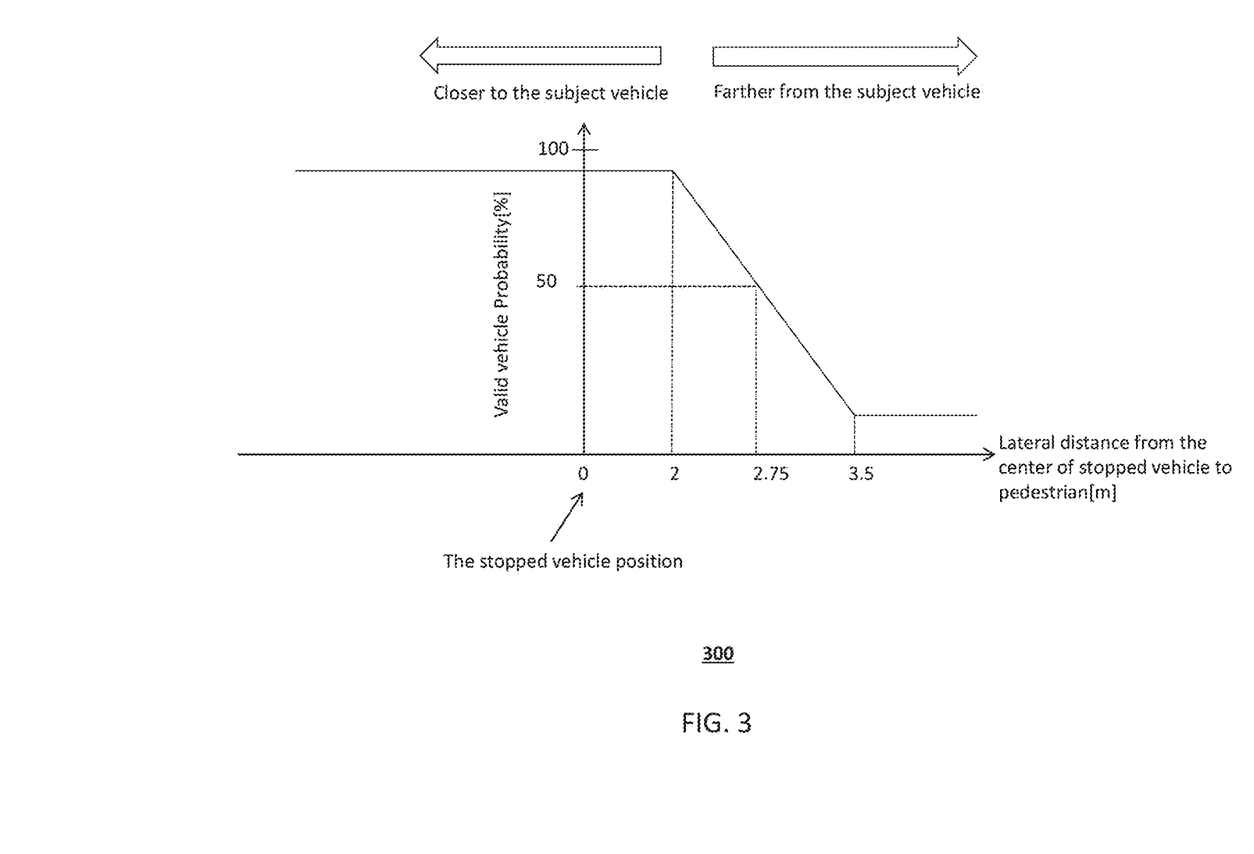
FIG. 3 illustrates an example graph demonstrating operations of an identification module according to the disclosed subject matter.

FIG. 3 shows an example graph 300 illustrating how the identification module 130 (FIG. 1) determines a valid vehicle possibility based on the detected presence of a pedestrian and the determined lateral distance. The x-axis represents the lateral distance between the pedestrian and the stationary vehicle. The y-axis represents the probability that the stationary vehicle is a valid vehicle. When the lateral distance is below a threshold amount, for example 2.75 meters, the probability can be considered to be greater than fifty percent. In this case, 2.75 meters is effectively the threshold distance below which the identification module 130 can classify the stationary vehicle as a valid vehicle. If no pedestrian is present or the lateral distance is greater than the threshold distance, the identification module can classify the stationary vehicle as an abandoned vehicle. It should be understood that the exact values and slope of the graph can be adjusted as part of a tuning process.

In addition, referring back to FIG. 1, the identification module 130 can include instructions to consider one or more other factors to determine which type of vehicle a stationary vehicle is. For example, in one embodiment, the identification module 130 can classify the stationary vehicle based on identifying, in the information from the sensors 162, lights on the stationary vehicle flashing with colors and/or in a pattern that is predetermined to identify valid vehicles, e.g., red and blue flashing lights identifying a police car.

The identification module 130 can consider other factors, including whether the stationary vehicle identifies itself through a wireless communication, such as V2X, or whether a cloud service includes a vehicle profile of a valid vehicle being present at the same location as the stationary vehicle. For example, the identification module 130 can send an identification request to the stationary vehicle via the V2X device 194 or send a request to a cloud service via the network interface 192, including a present location of the subject vehicle in the request, to check whether a valid vehicle has been reported to be present at the location.

Furthermore, the identification module 130 can check whether the database 170 already contains a stored profile 190 identifying the stationary vehicle as valid or abandoned. If no profile 190 exists, the identification module can create a profile 190 based on the determination. The profile 190 can include, for example, the type of stationary vehicle (e.g., valid or abandoned), the location of the stationary vehicle, and the time that the classification of the vehicle was made. Due to the transient nature of roadside vehicles, the vehicle control system 100 can include instructions to cause the processor 110 to purge profiles 190 from the database 170 that have been stored for a set amount of time, for example, one day.

In addition to storing the profile 190, the identification module 130 can include instructions to transmit the profile 190 indicating the type of the stationary vehicle to an external system via the network interface 192. The external systems are separate from and external to the subject vehicle and can be, for example, a cloud-based server service, a mobile computing device, or a different vehicle.

As discussed above, different jurisdiction can enforce different rules regarding the response that a vehicle should take when approaching a valid vehicle. Accordingly, in one or more of the disclosed embodiments the analysis module 140 includes instructions that, when executed by the processor 110, cause the processor 110 to obtain a local traffic regulation based on a location of the subject vehicle. The analysis module 140 can determine the location based on, for example, information from the GPS 164, or information received from an external system (e.g., mobile computing device) via the network interface 192. Based on the location, the analysis module 140 can determine which actions are required by the local traffic regulation. For example, the analysis module 140 can retrieve the required speed and/or trajectory modifications from a look-up table stored in the database 170 or send a request for the information to a cloud-based server via the network interface 192.

The vehicle control system 100 can take a responsive action based on the local traffic regulation in any of several ways, depending in part on whether the subject vehicle is autonomous or human-driven. In an autonomous vehicle, the drive control module 150 includes one or more instructions that, when executed by the processor 110, cause the processor 110 to modify a trajectory of the subject vehicle based on the local traffic regulation when the type of the stationary vehicle is determined to be valid. Modifying the trajectory can include one or more of modifying the speed of the subject vehicle, changing lanes, or shifting to an edge of a current lane. The drive control module 150 determines the modification based on several factors, including the regulation requirements, the determined type of the stationary vehicle, and the current environmental context.

As shown in FIGS. 1-2, the subject vehicle 200 can include sensors 162 that detect information about the environment around the subject vehicle 200. Before executing a trajectory modification that includes changing lanes, the drive control module 150 can check the sensor data 180 to determine whether any other vehicles are present in the adjacent lane, e.g., in region 220.

Figure 4:
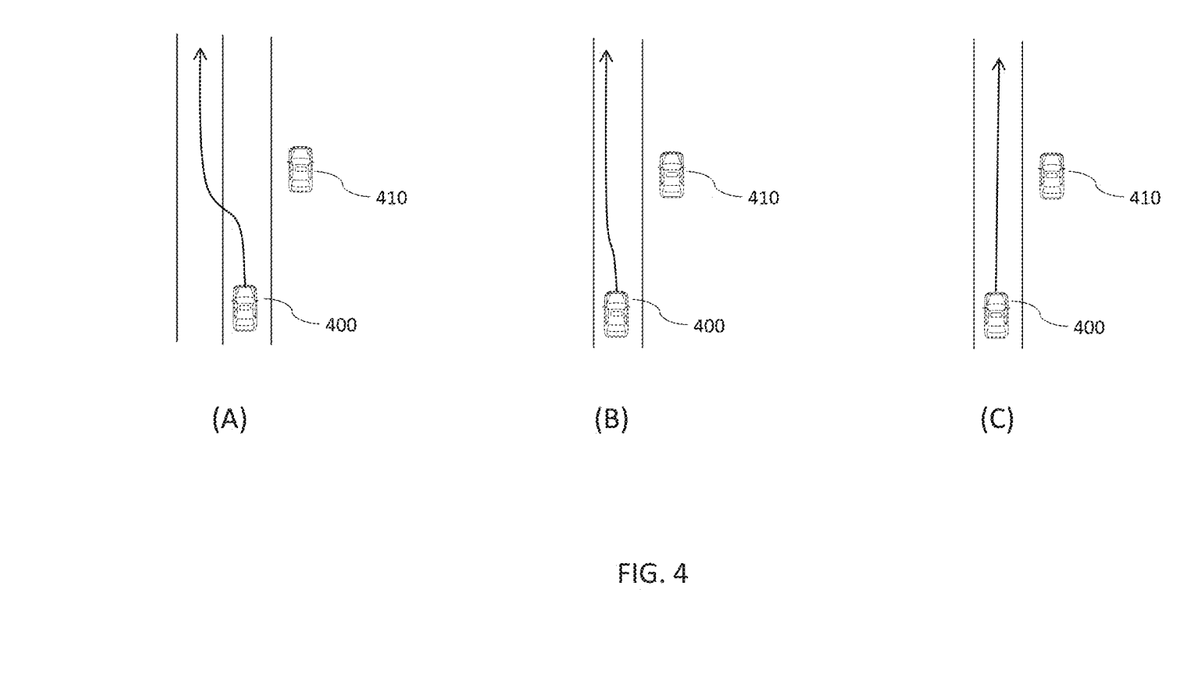
FIG. 4 illustrates example trajectory change scenarios that the disclosed vehicle control system can execute.

FIG. 4 shows different possible trajectory change scenarios. When the local traffic regulation requires drivers approaching a valid vehicle to vacate the lane closest to the valid vehicle, if safe and possible to do so (e.g., as Indiana state law requires), the drive control module 150 executes the trajectory change shown in scenario (A), provided no other vehicles are detected in the target region of the adjacent lane. That is, the subject vehicle 400 completes a complete lane change away from the stationary vehicle 410.

In some jurisdictions the local traffic regulation might not require a lane change. For example, as of the time of this filing New Hampshire move over law requires an approaching vehicle to "slow to a safe speed and give wide berth" to valid vehicles. Even in jurisdictions that do require a lane change, many qualify the requirement with the phrase "if safe to do so." Therefore, if another vehicle is in the adjacent lane beside the subject vehicle, a lane change is not a safe maneuver. In these situations the drive control module 150 can execute the trajectory change shown in scenario (B). Here, the subject vehicle 400 shifts to an edge of the current lane away from the stationary vehicle 410, but without changing lanes.

Thus, the drive control module 150 can includes instructions to modify the trajectory by shifting to an edge of a current lane when the sensor data 180 indicates that a second vehicle is in the adjacent lane, and to modify the trajectory by changing lanes to the adjacent lane when the sensor data 180 indicates that the second vehicle is not in the adjacent lane.

In contrast, if the stationary vehicle is not a valid vehicle the drive control module 150 will not execute any change to the current trajectory, as shown in scenario (C). That is, the subject vehicle 400 will take no lane related action relative to the stationary vehicle 410 and instead pass directly by the stationary vehicle 410.

In addition to the lane maneuver, the drive control module 150 takes into account the speed requirements of the local traffic regulation and the distances at which the speed requirements are applicable. For example, as of the time of this filing Alabama move over law requires drivers to "slow to at least 15 mph less than the posted speed limit" if a lane change is not possible. Washington requires a driver to slow down "within 200 feet before and after" a valid vehicle if the driver is not able to change lanes. Furthermore, as general a best practice in driving drivers approaching a stopped valid vehicle should take steps to mitigate against driving directly past and alongside the valid vehicle, particularly at high speed.

Figure 5:
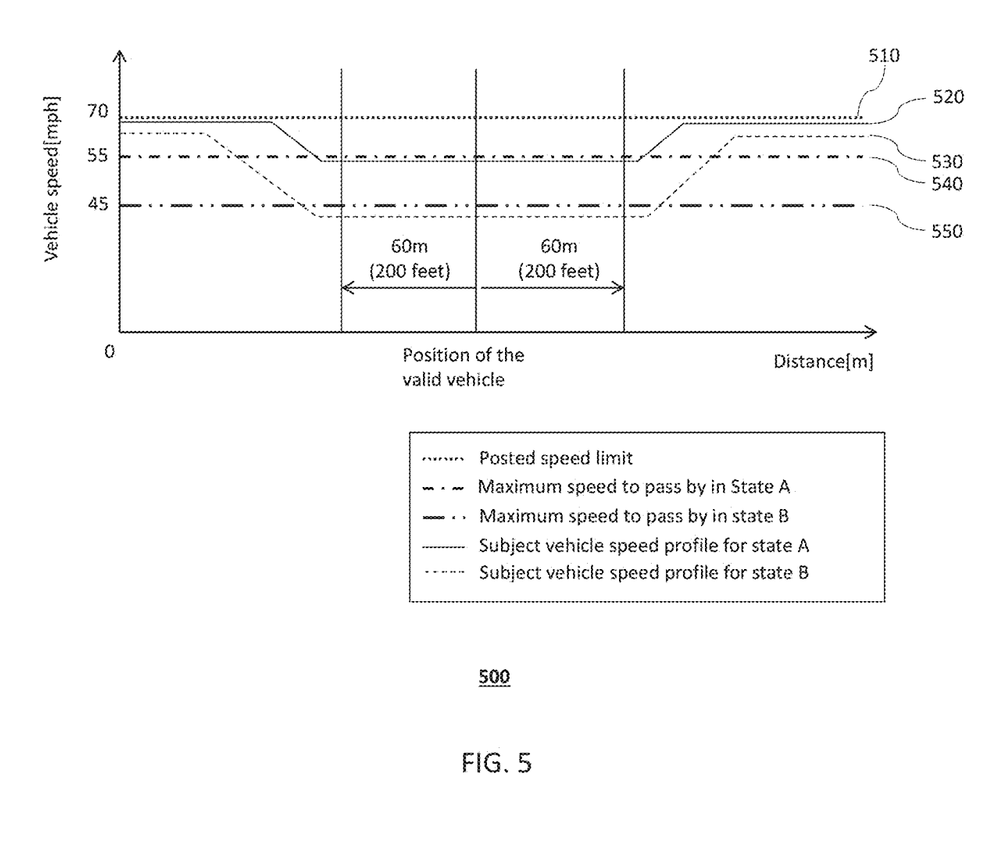
FIG. 5 illustrates a graph of example speed modifications that a drive control module can implement according to the disclosed subject matter.

FIG. 5 shows a graph 500 of example speed modifications that the drive control module can implement when a lane change is not safe, and the distances to which the modifications are applied. The x-axis represents the distance the subject vehicle has traveled after detecting the valid vehicle. The y-axis represents the speed of the subject vehicle.

Line 510 represents the posted speed limit. In some jurisdictions the move over law requires a driver to slow to a speed that is a specific amount below the posted speed limit. For example, as of the time of this filing Alabama law requires a driver to "slow to at least 15 mph less than the posted speed limit" when a lane change is not possible. Accordingly, line 540 represents a maximum speed in an exemplary jurisdiction, e.g., "State A". Since all jurisdictions are not uniform in speed reduction requirements, line 550 represents a different maximum speed requirement in a different jurisdiction, e.g., "State B", wherein the maximum speed is 25 mph less than the posted speed limit. In this example, State A and State B move over laws both require drivers to slow down to the maximum speed limit for 200 feet before and after the valid vehicle.

Referring to FIGS. 1 and 5, as previously stated, the identification module 130 can identify posted speed limits based on the sensor data 180. Accordingly, based at least in part on the identified speed limit and the local traffic regulation, the drive control module 150 can determine the appropriate speed modification to implement when approaching a valid vehicle in State A or in State B. Line 520 represents the subject vehicle speed profile that the drive control module 150 would implement in State A. That is, the subject vehicle will slow to a speed slower than 55 mph at least 200 feet before the valid vehicle, maintain the reduced speed for at least 200 feet after passing the valid vehicle, and thereafter resume the previous speed. Similarly, line 530 represents the subject vehicle speed profile that the drive control module 150 would implement in State B.

Thus, when the local traffic regulation includes a maximum speed to pass valid vehicles and includes a distance from valid vehicles over which the maximum speed is to be maintained, the drive control module 150 includes instructions to modify the trajectory by maintaining the maximum speed over a span of the distance between the subject vehicle approaching and departing from the stationary vehicle identified as valid.

Referring to FIG. 1, regardless of whether the drive control module 150 executes a speed or trajectory modification, the vehicle control system 100 can include a notification module 160 including one or more instructions that, when executed by the processor 110, cause the processor 110 to provide a notification to a user of the subject vehicle regarding the detected stationary vehicle. The notification can indicate the subject vehicle is approaching a stationary vehicle and the type of the stationary vehicle. If the stationary vehicle is a valid vehicle, the notification can indicate the local regulation that is applicable to the situation. If the subject vehicle is an autonomous vehicle, the notification can further indicate the trajectory/speed modification that the drive control module 150 will implement in accordance with the local regulation and the environmental circumstances.

Thus, in one embodiment, the notification module 160 can generate a control signal that indicates the type of stationary vehicle that has been detected and that causes the subject vehicle to perform one or more actions based on the type of stationary vehicle. The actions can include the drive control module 150 modifying a trajectory of the subject vehicle based on the local traffic regulation when the control signal indicates that the type of the stationary vehicle is valid, or simply transmitting a notification to a human driver without taking any action by the drive control module 150.

Figure 6:
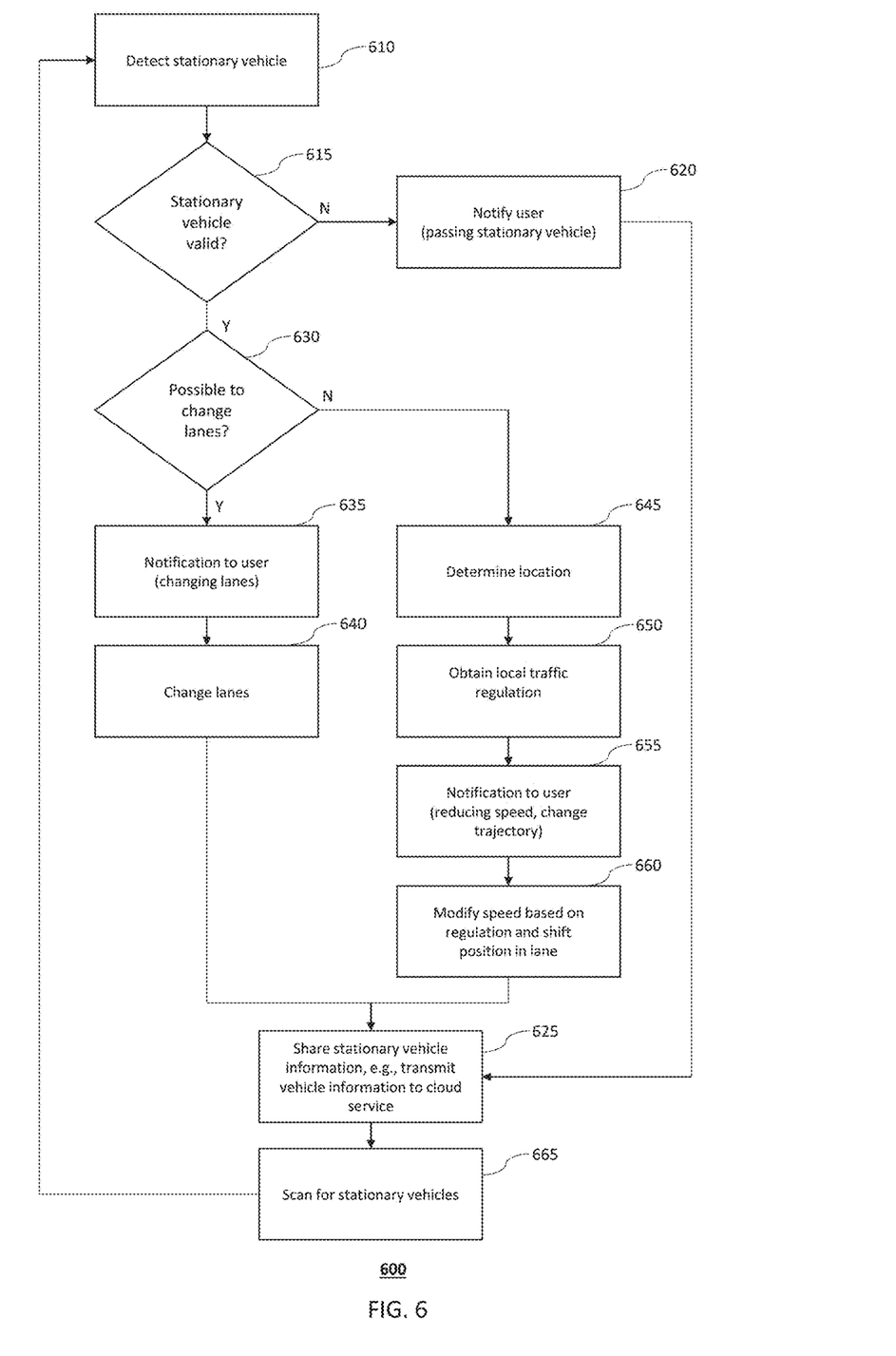
FIG. 6 illustrates a flowchart showing an embodiment of a method of operation for a vehicle control system according to the disclosed subject matter.

FIG. 6 shows a flowchart 600 of an embodiment of a method of operation for the disclosed vehicle control system 100 in an autonomous vehicle. At operation 610 the system 100 detects a stationary vehicle. At operation 615 the system 100 determines whether the stationary vehicle is a valid vehicle, for example, based on one or more of the factors discussed above. If the system 100 determines that the stationary vehicle is not a valid vehicle, then at operation 620 the system 100 transmits a notification to the user indicating that the subject vehicle is about to pass a stationary vehicle. At operation 625 the system 100 shares the determination with other vehicles, for example, by transmitting a vehicle profile to a cloud-based service. The vehicle profile can include the determined type of the stationary vehicle, the location and the time that the determination was made. At operation 665 the system scans for the next stationary vehicle.

If the stationary vehicle is determined to be valid at operation 615, then at operation 630 the vehicle control system 100 determines whether a lane change is possible. If a lane change is possible, at operation 635 the system 100 notifies the user (passenger/driver) that the subject vehicle is approaching a valid vehicle and will soon change lanes. At operation 640 the system 100 executes the lane change. At operation 625 the system 100 shares the classification of the stationary vehicle with other vehicles, as described above. At operation 665 the system scans for the next stationary vehicle.

If a lane change is not possible, at operation 645 the vehicle control system 100 determines a location of the subject vehicle. At operation 650 the system 100 obtains local traffic regulations, i.e., the move over law for the jurisdiction that the subject vehicle is currently in. At operation 655 the vehicle control system 100 transmits a notification to the user indicating that the system 100 is about to modify the speed/trajectory of the subject vehicle in accordance with the local traffic regulation. The notification can indicate the speed modification that the system 100 is about to execute, i.e., the amount of speed reduction and the distance over which the system 100 will maintain the reduced speed. The notification can further indicate that the subject vehicle will shift trajectory to an edge of the current lane without changing lanes.

At operation 660 the vehicle control system 100 executes the speed/trajectory modification. At operation 625 the system 100 shares the classification of the stationary vehicle with other vehicles, as described above. At operation 665 the system scans for the next stationary vehicle.

Figure 7:
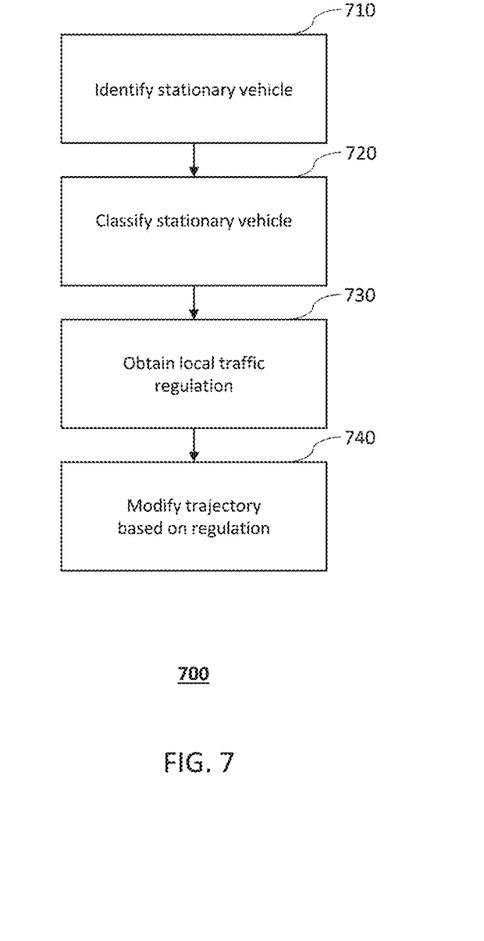
FIG. 7 illustrates flowchart showing another embodiment of a method of operation for a vehicle control system according to the disclosed subject matter.

FIG. 7 shows a flowchart 700 for an embodiment of a general operational method of the disclosed vehicle control system. At operation 710 the system identifies a stationary vehicle in an environment of the subject vehicle based at least in part on information from a plurality of sensors disposed on the subject vehicle. At operation 720 the system classifies a type of the stationary vehicle as valid or abandoned based at least in part on the information, e.g., by using the information to determine a presence of a pedestrian near the stationary vehicle, a valid vehicle being one that a traffic regulation indicates the subject vehicle is to undertake a responsive action toward. At operation 730 the system obtains a local traffic regulation based on a location of the subject vehicle. At operation 740 the system 100 modifies a trajectory of the subject vehicle based on the local traffic regulation when the type of the stationary vehicle is determined to be valid.

It should be appreciated that the vehicle control system 100 from FIG. 1 can be configured in various arrangements with separate integrated circuits and/or chips. In such embodiments, the identification module 130 from FIG. 1 can be embodied as a separate integrated circuit. Additionally, the analysis module 140, drive control module 150 and notification module 160 can each be embodied on individual integrated circuits. The circuits can be connected via connection paths to provide for communicating signals between the separate circuits. While separate integrated circuits are discussed, in various embodiments, the circuits may be integrated into a common integrated circuit board. Additionally, the integrated circuits may be combined into fewer integrated circuits or divided into more integrated circuits. In another embodiment, the modules 130, 140, 150 and 160 may be combined into a separate application-specific integrated circuit. In further embodiments, portions of the functionality associated with the modules 130, 140, 150 and 160 may be embodied as firmware executable by a processor and stored in a non-transitory memory. In still further embodiments, the modules 130, 140, 150 and 160 are integrated as hardware components of the processor 110.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies (e.g., methods 600 and 700 of FIGS. 6 and 7) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The vehicle control system 100 can include one or more processors 110. In one or more arrangements, the processor(s) 110 can be a main processor of the vehicle control system 100. For instance, the processor(s) 110 can be an electronic control unit (ECU). The vehicle control system 100 can include one or more data stores for storing one or more types of data. The data stores can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, distributed memories, cloud-based memories, other storage medium that are suitable for storing the disclosed data, or any combination thereof. The data stores can be a component of the processor(s) 110, or the data store can be operatively connected to the processor(s) 110 for use thereby. The term "operatively connected," as used throughout this description, can include direct or indirect connections, including connections without direct physical contact.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle control system for a subject vehicle, comprising:
   a plurality of sensors that output information describing an environment around the subject vehicle;
   a global positioning system that determines a location of the subject vehicle;
   one or more processors; and
   a memory communicably connected to the one or more processors and storing:
      a first set of computer-readable instructions including one or more instructions that, when executed by the one or more processors, cause the one or more processors to identify a stationary vehicle in the environment based at least in part on the information from the plurality of sensors and classify a type of the stationary vehicle as valid or abandoned based at least in part on the information, wherein a classification of valid indicates that a traffic regulation requires the subject vehicle to undertake a responsive action toward the stationary vehicle;
      a second set of computer-readable instructions including one or more instructions that, when executed by the one or more processors, cause the one or more processors to obtain a local traffic regulation based on the location of the subject vehicle; and
      a third set of computer-readable instructions including one or more instructions that, when executed by the one or more processors, cause the one or more processors to modify a trajectory of the subject vehicle based on the local traffic regulation when the type of the stationary vehicle is determined to be valid and maintain a current trajectory of the subject vehicle when the type of the stationary vehicle is determined to be abandoned.

2. The vehicle control system of claim 1, wherein the first set of computer-readable instructions includes instructions to process at least some of the information from the plurality of sensors to detect a presence of a pedestrian in a vicinity of the stationary vehicle and determine a lateral distance between the pedestrian and the stationary vehicle, and the identification module further includes instructions that classify the type of the stationary vehicle as valid or abandoned based at least in part on the lateral distance.

3. The vehicle control system of claim 1, further comprising a fourth set of computer-readable instructions including one or more instructions that, when executed by the one or more processors, cause the one or more processors to provide a notification to a user of the vehicle, the notification indicating at least the type of the stationary vehicle.

4. The vehicle control system of claim 1, wherein, when the first set of computer-readable instructions determines the type of the stationary vehicle to be valid, the fourth set of computer-readable instructions includes instructions to indicate in the notification that the trajectory of the subject vehicle will be modified based on the local traffic regulation.

5. The vehicle control system of claim 1, wherein the plurality of sensors includes a forward radar, a forward camera, or forward LIDAR sensors that contribute to the information such that the information indicates the stationary vehicle is ahead of the subject vehicle, and two or more radars that contribute to the information such that the information indicates whether a second vehicle is in an adjacent lane to the subject vehicle.

6. The vehicle control system of claim 1, wherein the third set of computer-readable instructions includes instructions to modify the trajectory by shifting to an edge of a current lane when the information indicates that the second vehicle is in the adjacent lane, and to modify the trajectory by changing lanes to the adjacent lane when the information indicates that the second vehicle is not in the adjacent lane.

7. The vehicle control system of claim 1, wherein the local traffic regulation includes a maximum speed to pass valid vehicles and includes a distance from valid vehicles over which the maximum speed is to be maintained, and the third set of computer-readable instructions includes instructions to modify the trajectory by maintaining the maximum speed over a span of the distance between the subject vehicle approaching and departing from the stationary vehicle identified as valid.

8. The vehicle control system of claim 1, further comprising a vehicle-to-everything (V2X) device to receive a communication from the stationary vehicle indicating that the stationary vehicle is valid, and the first set of computer-readable instructions includes instructions to classify the type of the stationary vehicle based at least in part on the communication.

9. The vehicle control system of claim 1, further comprising a network interface that wirelessly communicates with one or more external systems, and the first set of computer-readable instructions includes instructions to:
request identification of the type of the stationary vehicle from the one or more external systems via the network interface; and
classify the type of the stationary vehicle based at least in part on a response to the request received via the network interface,
wherein the one or more external systems are separate from and external to the subject vehicle.

10. The vehicle control system of claim 1, further comprising a network interface that wirelessly communicates with one or more external systems, and the first set of computer-readable instructions includes instructions to transmit data indicating the type of the stationary vehicle to one or more external systems via the network interface, wherein the one or more external systems are separate from and external to the subject vehicle.

11. A non-transitory computer-readable medium storing instructions for controlling a subject vehicle and that when executed by one or more processors cause the one or more processors to:
identify a stationary vehicle in an environment of the subject vehicle based at least in part on information from a plurality of sensors disposed on the subject vehicle;
classify a type of the stationary vehicle as valid or abandoned based at least in part on the information, wherein a classification of valid indicates that a traffic regulation requires the subject vehicle to undertake a responsive action toward the stationary vehicle;
obtain a local traffic regulation based on a location of the subject vehicle; and
control the subject vehicle by modifying a trajectory of the subject vehicle based on the local traffic regulation when the type of the stationary vehicle is determined to be valid and maintaining a current trajectory of the subject vehicle when the type of the stationary vehicle is determined to be abandoned.

12. The non-transitory computer-readable medium of claim 11, wherein the instructions to classify the type of the stationary vehicle include instructions to:
process at least some of the information from the plurality of sensors to detect a presence of a pedestrian in a vicinity of the stationary vehicle;
determine a lateral distance between the pedestrian and the stationary vehicle; and
classify the type of the stationary vehicle as valid or abandoned based at least in part on the lateral distance between the pedestrian and the stationary vehicle.

13. The non-transitory computer-readable medium of claim 11, the instructions to control the subject vehicle further comprising instructions to provide a notification to a user of the vehicle, the notification indicating at least the type of the stationary vehicle.

14. The non-transitory computer-readable medium of claim 13, wherein the instructions to provide the notification further include instructions to, when the type of the stationary vehicle is valid, indicate in the notification that the trajectory of the subject vehicle will be modified based on the local traffic regulation.

15. The non-transitory computer-readable medium of claim 11, wherein the instructions to identify the stationary vehicle include instructions to process the information from the plurality of sensors including a forward radar, a forward camera, or forward LIDAR sensors that contribute to the information such that the information indicates the stationary vehicle is ahead of the subject vehicle, and including two or more radars that contribute to the information such that the information indicates whether a second vehicle is in an adjacent lane to the subject vehicle.

16. The non-transitory computer-readable medium of claim 15, wherein the instructions to modify the trajectory include instructions to:
modify the trajectory by shifting the subject vehicle to an edge of a current lane when the information indicates that the second vehicle is in the adjacent lane; and
modify the trajectory by changing lanes to the adjacent lane when the information indicates that the second vehicle is not in the adjacent lane.

17. The non-transitory computer-readable medium of claim 11, wherein the local traffic regulation includes a maximum speed to pass valid vehicles and includes a distance from valid vehicles over which the maximum speed is to be maintained, and the instructions to modify the trajectory include instructions to maintain the maximum speed over a span of the distance between the subject vehicle approaching and departing from the stationary vehicle identified as valid.

18. The non-transitory computer-readable medium of claim 11, the instructions to control the subject vehicle further including instructions to:
receive, via a vehicle-to-everything (V2X) device, a communication from the stationary vehicle indicating that the stationary vehicle is valid,
wherein the instructions to classify the type of the stationary vehicle includes instructions to classify the type of the stationary vehicle based at least in part on the communication.

19. The non-transitory computer-readable medium of claim 11, wherein the instructions to identify the stationary vehicle includes instructions to request identification of the type of the stationary vehicle from an external system via a network interface, and the instructions to classify the type of stationary vehicle includes instructions to classify the type of the stationary vehicle based at least in part on a response to the request received via the network interface, wherein the external system is separate from and external to the subject vehicle.

20. A method for operating a subject vehicle, comprising:
identifying a stationary vehicle in an environment of the subject vehicle based at least in part on information from a plurality of sensors on the subject vehicle;
classifying a type of the stationary vehicle as valid or abandoned based at least in part on the information, wherein a classification of valid indicates that a traffic regulation requires the subject vehicle to undertake a responsive action toward the stationary vehicle; and
generating a control signal that causes the subject vehicle to perform the responsive action when the stationary vehicle is classified as valid,
wherein the vehicle is classified as valid based at least in part on detecting a pedestrian within a threshold vicinity of the stationary vehicle.

* * * * *

UNITED STATES PATENT AND TRADEMARK OFFICE
CERTIFICATE OF CORRECTION

PATENT NO. : 11,276,304 B2
APPLICATION NO. : 16/226933
DATED : March 15, 2022
INVENTOR(S) : Matthew Gesch, Jin Kurumisawa and Andrew Mueller It is certified that error appears in the above-identified patent and that said Letters Patent is hereby corrected as shown below:

In the Claims

Claim 3, Line 5: delete "the vehicle" insert --the subject vehicle--

Claim 4, Line 1: delete "1," insert --3,--

Claim 5, Line 3: delete "or forward LIDAR sensors" insert --or a forward LIDAR sensor--

Claim 6, Line 1: delete "1," insert --5,--

Claim 8, Lines 3 and 4: delete "that the stationary vehicle" insert --that the type of the stationary vehicle--

Claim 13, Line 4: delete "the vehicle" insert --the subject vehicle--

Claim 14, Lines 3 and 4: delete "to, when the type of the stationary vehicle is valid, indicate" insert --to indicate, when the type of the stationary vehicle is valid,--

Claim 15, Line 5: delete "or forward LIDAR sensors" insert --or a forward LIDAR sensor--

Claim 18, Lines 5 and 6: delete "that the stationary vehicle" insert --that the type of the stationary vehicle--

Claim 19, Line 3: delete "vehicle includes instructions" insert --vehicle include instructions--

Claim 19, Lines 5 and 6: delete "the type of stationary vehicle includes instructions" insert --the type of the stationary vehicle include instructions--

Claim 20, Lines 11 and 12: delete "when the stationary vehicle" insert --when the type of the Signed and Sealed this
Twentieth Day of September, 2022

*Katherine Kelly Vidal*

Katherine Kelly Vidal
*Director of the United States Patent and Trademark Office* stationary vehicle--

Claim 20, Line 13: delete "wherein the vehicle" insert --wherein the type of the stationary vehicle--